June 5, 1945.   G. F. MILLER   2,377,640
REEL
Filed May 24, 1944

Inventor
George F. Miller,
By McMorrow & Berman
Attorneys

Patented June 5, 1945

2,377,640

UNITED STATES PATENT OFFICE 2,377,640

REEL

George F. Miller, Warren, Ohio

Application May 24, 1944, Serial No. 537,087

8 Claims. (Cl. 242—100)

This invention relates to reels and more particularly to that type of reel adapted for use with clotheslines or the like.

A primary object of the invention is the provision of such a reel which will facilitate the handling of the line, permitting it to be lowered or tightened to any requisite degree as desired.

An additional object is the provision of such a device which may be readily positioned for use and removed when it has served its purpose.

A still further object is the provision of such a reel which will be efficient and reliable in operation, compact in size and sturdy and durable in operation.

A more specific object is the provision of a reel provided with a rachet and pawl device for tensioning the line and provided with a relative long lever to permit the exertion of a substantial force thereon, but which may be folded into a relatively compact space and adapted to serve as a reinforcing member for the frame.

Other objects will in part be obvious and in part pointed out hereinafter.

Having reference now to the accompanying drawing wherein there is shown a preferred embodiment of this inventive concept:

Figure 1 is a front elevational view, partly in section.

Figure 2 is an end elevational view of the device of Figure 1 as viewed from the left, and Figure 3 is a sectional view taken along the line 3—3 of Figure 1 as viewed from the right.

Similar reference characters refer to similar parts throughout the several views of the drawing.

Having now particular reference to Figure 1 there is generally indicated at 10 a drum or reel. Reel 10 is comprised of a cylindrical portion 11 at the opposite ends of which are positioned circular flanges 12 and 13. Reel 10 has an axially disposed bore therethrough through which is passed a shaft 14 secured tightly and firmly in any suitable manner to reel 10 and mounted in a manner to be hereinafter described to permit rotation of reel 10. Flanges 12 and 13 are provided with radial ribs 15 (see Figures 2 and 3) for the purpose of reinforcing the same and preventing their deformation when a rope or similar article is wound on reel 10. Flange 13 has a hole 16 therethrough in which one end of the rope (not shown) may be secured.

A frame 20 is provided for the mounting of reel 10 and is comprised of an upper transverse member 21 at the opposite ends of which two legs 22 and 23 extend vertically downward at right angles therefrom. Leg 23 is provided at its extremity with an enlarged lower end portion 24 having a circular aperture therethrough (see Figure 3), designed to accommodate and support one end of shaft 14 rotatably therein.

It may here be pointed out that leg 22 is of substantially greater length than leg 23, and it is provided, approximately midway of its length and in alignment with portion 24, with a similar enlarged portion 26 having an aperture 27 therethrough (see Figure 2), in which the opposite end of shaft 14 is journaled. Adjacent the lower extremity of leg 22 which terminates in an angularly formed end 28 is a lateral recess 29 all for a purpose to be more fully pointed out hereinafter.

Having reference now to the mounting of frame 20 the transverse member 21 is, as best shown in Figure 3, T-shaped in cross section and adapted slidably to engage in a channeled recess 30 in the under side of a mounting member 31. One end of channel 30 is open and the other closed as by an end plate 32. Suitable counter-sunk holes are provided in the closed top side of member 31 through which screws, not shown, may be passed for securing the device in any desired location, the counter-sinking of such holes permitting heads of the screws to clear channel 31 whereby member 21 of frame 20 may be readily slid in and out of channel 30.

Frame 20 is secured in mounting member 31 by means of a latch 33 pivotally mounted by a pivot 34 on leg 22 of frame 20. Latch 33 has an offset end portion 35 adapted to engage end plate 32 when swung into closed position, by means of a handle portion 36, and into parallel alignment with leg 22, thus holding the relative parts against slippage. It may here be pointed out that member 21 is also provided with a centrally disposed hook 37 on the inner face thereof, the purpose of which will be more fully set out thereinafter.

Referring back to reel 10 and the mounting thereof, a collar 40 is positioned on the shaft 14 between member 24 and flange 13 and serves to space the reel suitably from operating mechanism now to be described.

The end of shaft 14 extends through the aperture in the part 24 and a substantial distance beyond, and secured to this extended portion of the shaft is a ratchet 41. On opposite sides of ratchet 41 and mounted for rotation on shaft 14 are the opposite side pieces 42 and 43 of a ratchet extending handle generally indicated at 44, between which side pieces is a filler member 45 of any suitable material, the two side pieces and the filler being secured in related assembly as by rivets 46.

Handle 44 is provided at a mid portion with a hinge pin 50 whereby the outer portion thereof may be swung and positioned at right angles in a direction towards leg 22 to form a substantially rectangular frame when latched (see Figure 1). The end portion of handle 44 has positioned therein between the two side members a spring 51 forcing a latch 52 into engagement with recess 29 of leg 22, and the tapered end 28 facilitating the insertion of the end of leg 22 into a recess 53 in the outer end portion of handle 44.

An outwardly extending portion 54 of latch 52 having a right angled portion 55 at the extremity thereof is movable inwardly to permit release of the latch from recess 29 whereby the now horizontally disposed part of handle 44 may be swung downwardly into straight line position with relation to the vertical part thereof thereby greatly increasing the leverage which it may transmit.

Referring back now to ratchet 41 there is located adjacent thereto a ratchet dog 58 pivotally mounted on leg 23 of frame 20 as by a pivot 59 and provided with an extending handle 60 serving as a weight to hold the dog in engagement with ratchet 41 whereby the same may be pressed by hand and precluded from movement when desired.

Likewise adjacent ratchet 41 is a pawl 61 provided with a releasing handle 62 and secured in position in a suitable recess between side members 42 and 43 of handle 44.

Pawl 61 is mounted on a pivot 63 and forced towards ratchet 41 by means of a double armed spring 64 having a coiled end secured to one of the rivets 46 (see Figure 3).

The pawl 61 has an offset near its pivot to be engaged by one end of the spring 64 to releasably secure said pawl in disengaged position, the other end of the spring abutting the opposite side of the pawl 61 directly and laterally opposite and in a horizontal plane coincident with the axis of the pivot of the pawl.

Secured to shaft 14 beyond side 43 of handle 44 is a crank 70 to which is secured a handle 71 by means of a screw 72 passed through a central bore in the handle and threadedly engaging crank 70, whereby upon release of dog 58 reel 10 may be manually rotated.

Now from the foregoing the operation of this device should be readily understood by those skilled in the art.

In placing the device in operation, member 31 is first positioned as above stated in a desired location. A rope may then have one end secured through aperture 16 and coiled about portion 11 of reel 10. The free end is formed into a bight and secured on hook 37. Section 21 of frame 20 is then inserted in the channel of member 31 and latched in position by latch 33. The free end of the rope is then released from the hook 37 and upon release of dog 58 the rope may be uncoiled and extended to a desired point, sufficient slack being present to allow the line to sag to a height convenient for hanging clothes. Latch 52 is now released and handle 44 extended. Operation of this handle oscillatorily on the shaft 14 and thereby actuating the ratchet and pawl means 41 and 61 results in tensioning the line to any desired degree, and when such tension is achieved ratchet wheel 41 is locked by dog 58 and handle 44 returned to and latched in its folded position.

When the device has served its purpose, dog 58 is again released, the rope coiled by means of handle 71 and the bight at the end of the rope secured over hook 37. Latch 33 is then released and frame 20 removed from channel member 30, whereupon handle 44 folded and locked serves as a convenient means for carrying the device as well as a reinforcement therefor.

Now from the foregoing it will be seen that there is herein provided a relatively simple and durable device accomplishing all the objects of the device and many others of great practical utility.

As many embodiments may be made of this inventive concept and many modifications made in the embodiment herein shown and described, it is to be understood that all matter hereinbefore set out is to be interpreted merely as illustrative and not in a limiting sense.

Having thus described my invention, what I claim is:

1. In a device of the character described, in combination, a frame member comprised of a transverse portion T shaped in cross section and two legs extending at right angles thereto, one of greater length, a shaft journaled for rotation in the end of one of and the mid portion of another of said legs, a reel secured to said shaft, a ratchet mounted on said shaft extension of said shorter leg, a pawl handle pivotally mounted on said shaft, a pawl pivoted to said handle adjacent said ratchet, said pawl handle being of a length substantially equal to the difference between said shorter and longer legs plus said transverse portion, and hinged at a point whereby the section thereof equal in length to said transverse portion may be folded at right angles to the section thereof equal to the difference between said longer and shorter legs to engage the end of said longer leg to form a substantially rectangular frame.

2. In a device of the character described, in combination, a frame member comprised of a transverse portion T shaped in cross section and two legs extending at right angles thereto, one of greater length, a shaft journaled for rotation in the end of one of and the mid portion of another of said legs, a reel secured to said shaft, a ratchet mounted on said shaft extension of said shorter leg, a pawl handle pivotally mounted on said shaft, a pawl pivoted to said handle adjacent said ratchet, said pawl handle being of a length substantially equal to the difference between said shorter and longer legs plus said transverse portion, and hinged at a point whereby the section thereof equal in length to said transverse portion may be folded at right angles to the section thereof equal to the difference between said longer and shorter legs to engage the end of said longer leg to form a substantially rectangular frame, and latch means for latching the end of said first mentioned section to the end of said longer leg.

3. In a device of the character described, in combination, a frame member comprised of a transverse portion T shaped in cross section and two legs extending at right angles thereto, one of greater length, a shaft journaled for rotation in the end of one of and the mid portion of another of said legs, a reel secured to said shaft, a ratchet mounted on said shaft extension of said shorter leg, a pawl handle pivotally mounted on said shaft, a pawl pivoted to the handle adjacent said ratchet, said pawl handle being of a length substantially equal to the difference between said shorter and longer legs plus said transverse portion, and hinged at a point whereby the section thereof equal in length to said transverse portion may be folded at right angles to the section thereof equal to the difference between said longer and shorter legs to engage the end of said longer leg to form a substantially rectangular frame, and a ratchet dog mounted on said shorter leg for securing said ratchet against rotation.

4. In a device of the character described, in combination, a frame member comprised of a transverse portion T shaped in cross section and two legs extending at right angles thereto, one of greater length, a shaft journaled for rotation in the end of one of and the mid portion of another of said legs, a reel secured to said shaft, a ratchet mounted on said shaft extension of said shorter leg, a pawl handle pivotally mounted on said shaft and a pawl pivoted to said handle adjacent said ratchet, said pawl handle being of a length substantially equal to the difference between said shorter and longer legs plus said transverse portion, and hinged at a point whereby the section thereof equal in length to said transverse portion may be folded at right angles to the section thereof equal to the difference between said longer and shorter legs to engage the end of said longer leg to form a substantially rectangular frame, and mounting means for said frame comprising a channel carrying mounting members adapted to be secured to a surface and into which said transverse portion T shaped in cross section may be slid.

5. In a device of the character described, in combination, a frame member comprised of a transverse portion T shaped in cross section and two legs extending at right angles thereto, one of greater length, a shaft journaled for rotation in the end of one of and the mid portion of another of said legs, a reel secured to said shaft, a ratchet mounted on said shaft extension of said shorter leg, a pawl handle pivotally mounted on said shaft, a pawl pivoted to the handle adjacent said ratchet, said pawl handle being of a length substantially equal to the difference between said shorter and longer legs plus said transverse portion, and hinged at a point whereby the section thereof equal in length to said transverse portion may be folded at right angles to the section thereof equal to the difference between said longer and shorter legs to engage the end of said longer leg to form a substantially rectangular frame, mounting means for said frame comprising a channel carrying mounting member adapted to be secured to a surface and into which said transverse portion T shaped in cross section may be slid, said mounting member having an end plate at one end, and a latch mounted on said longer leg adapted to engage said end plate to hold said frame and said mounting member in related assembly.

6. In a device of the character described, in combination, a substantially rectangular open frame, a drum rotatably mounted at its opposite ends in the end members of said frame, a ratchet secured to said drum coaxially at one end thereof, a pawl pivoted on an adjacent end portion of the frame and normally releasably engaging said ratchet, and a foldable handle having a pawl thereon normally releasably engaging said ratchet, said handle when folded comprising a part of said frame.

7. In a device of the character described, in combination, a substantially rectangular open frame, a drum rotatably mounted at its opposite ends in end members of the frame, a ratchet secured to said drum coaxially at one end thereof, a foldable handle associated with said ratchet and carrying a releasable pawl normally in engagement with said ratchet, said handle when folded comprising a part of said frame, and a dog mounted movably on an adjacent frame portion in cooperative relation to and capable of releasably locking said ratchet at the will of an operator.

8. In a device of the character described, in combination, a substantially rectangular open frame, a drum rotatably mounted at its opposite ends in end members of the frame, a ratchet secured to said drum coaxially with one end thereof, a foldable handle associated with said ratchet and carrying a releasable pawl normally in engagement with said ratchet, said handle when folded comprising a part of said frame, means for releasably locking said handle in folded frame-forming position, and means including a dog movably mounted on an adjacent part of the frame for releasably engaging and locking said ratchet.

GEORGE F. MILLER.